March 13, 1928.

H. R. VAN DEVENTER

TESTING DEVICE

Filed Feb. 14, 1924

INVENTOR

Harry R. Van Deventer

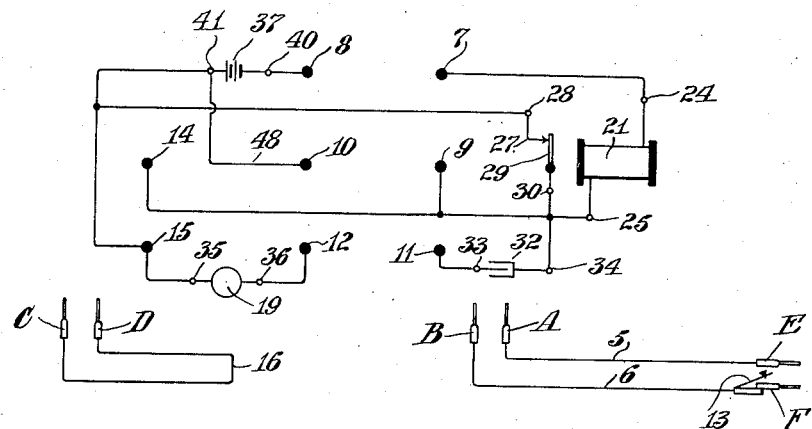
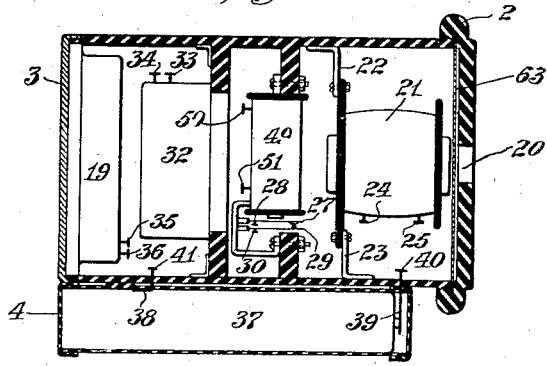
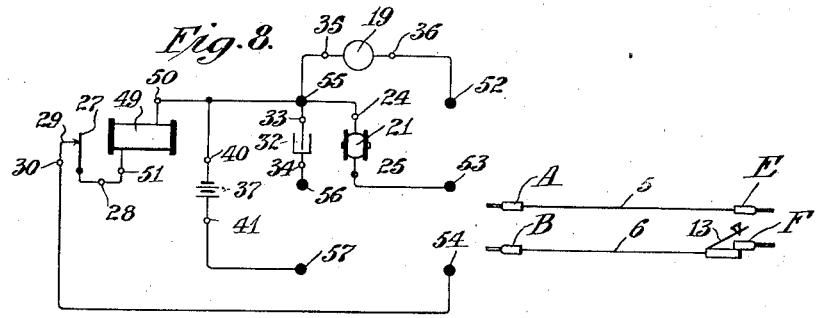

Patented Mar. 13, 1928.

1,662,548

UNITED STATES PATENT OFFICE.

HARRY R. VAN DEVENTER, OF NEW YORK, N. Y., ASSIGNOR TO DUBILIER CONDENSER CORPORATION, A CORPORATION OF DELAWARE.

TESTING DEVICE.

Application filed February 14, 1924. Serial No. 692,784.

This invention relates to testing devices, and more particularly to testing devices which may be used to make tests to discover the nature and location of trouble in electrical circuits. Tests of this nature are frequently made on induction coils, lighting circuits, motor or generator armatures, fuses, relays, and various types of wiring.

In testing electrical circuits to discover the nature of trouble, it is frequently desirable to connect various types of equipment to the circuit. The usual equipment for locating trouble consists of a telephone receiver, a buzzer, a condenser, a source of potential or a voltmeter. It is frequently desirable to connect this various equipment in various combinations. That is, at certain times it may be desirable to connect a battery and buzzer to the circuit under test, at other times it may be desirable to connect battery and voltmeter to the circuit, and at other times it may be desirable to connect the receiver and condenser to the circuit.

It is the object of this invention to provide testing equipment having the above general characteristics, and in which the various equipment is mounted in a unit structure so that it may be readily transported and used.

A feature of the invention is the use of a unit structure containing various testing equipment in combination with a telephone head band, so that the test set may be worn on the head of the person making the test while leaving his hands free to make connection to the circuit or circuits to be tested.

A further feature of the invention is the manner in which the various equipment is electrically interconnected. The equipment is so wired that terminals appear at a point at which connections to them may readily be made, so that any part of the equipment, or combinations of the various parts of the equipment, may be readily connected to the test leads proper.

An added feature of the invention is the use of an electromagnet, one pole of which operates the diaphragm of a telephone receiver, while the other pole is utilized to operate a self-interrupting armature, so that the magnet may be utilized either as the magnet of a telephone receiver or as the operating magnet of a buzzer.

It is thought that the invention will be best understood from the following detailed description taken in conjunction with the accompanying drawings.

In the drawings, Fig. 1 shows a side elevation of the exterior of the instrument which contains the testing equipment and shows the terminals and cords by means of which interconnections of the equipment to the circuit under test may be accomplished.

Fig. 6 is a circuit diagram showing the manner in which the various pieces of equipment and the exterior connection terminals are interconnected.

Fig. 7 shows a modified form of test set and shows the casing of such test set partly in section.

Fig. 8 is a circuit diagram showing the manner in which the equipment and connection terminals of Fig. 7 are interconnected so that desired connections to the testing leads may be obtained.

A detailed description of the construction and operation of the device will now be given.

Figure 1:
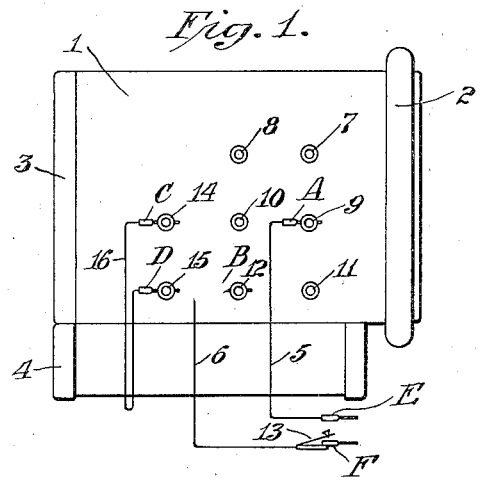
Figure 2:
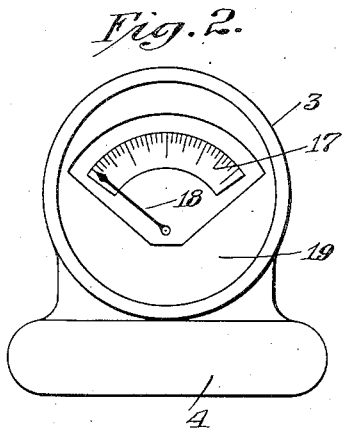
Fig. 2 shows an end view of the testing device.

Fig. 1 is a side view of the instrument. A cylindrical casing 1 serves to house the various apparatus to be used in the testing device. A receiver cap 2, which may be of any standard type, is screw threaded to the casing 1. A threaded ring 3 may be screwed to the opposite end of the casing and serves to hold a voltmeter in place. The voltmeter, as shown in Fig. 2, may be of any desired construction, and its dial, with the protecting glass face, serves as an end cover for the instrument. The lower portion of the casing, which is preferably molded from some insulating material, is expanded at the bottom to form a base on which the instrument may rest if it is desired to use it without a head band. The base also provides a stable support for the instrument when it is to be used merely as a voltmeter. It is thought that the general shape of the instrument may be so readily understood by inspection of Figs. 1 and 2 that no further description of the casing need be given. It is of course obvious that the casing may take any desired or convenient shape. The preferred embodiment of the invention, however, provides for a case substantially of the shape shown in Figs. 1 and 2, and in which the base portion of the case is of a suitable size to act as a receptacle for a dry cell battery of the type commonly used in flat pocket type flashlights. A hinged cover 4 may be used to permit batteries to be inserted or removed.

The casing is provided with eight terminal points which are connected to the apparatus within the case in a manner which will be more readily understood from the following detailed description to be given in connection with Fig. 6.

These terminals are eight in number and may be arranged in any suitable manner. For the sake of convenience, they have been shown as being distributed over one side of the casing. Another desirable arrangement of the terminals is to distribute them circumferentially about the casing at or near its middle circumference. The terminals may be of any desired type. The most convenient form of terminal is probably in the form of a jack so that tipped plugs may be inserted therein without the necessity of making them fast. However, if desired, the terminals may be ordinary screw binding posts or Fahnestock clips. Test cords 5 and 6 are provided with suitable tips for connecting with the various terminals. The tips A and B are arranged to connect with any of the terminals 7, 8, 9, 10, 11 or 12. Tips E and F are of a nature to be conveniently connected to the circuit or electrical device to be tested. A switch 13 of any desired type is provided so that circuit from the testing device to the circuit under test may be closed or opened at the will of the operator. Terminals 14 and 15 are utilized in connection with a jumper wire 16 provided with suitable tips C and D which cooperate with terminals 14 and 15. The cord 16 is never used with any terminals other than 14 or 15, and when the tips C and D are inserted in terminals 14 and 15 it merely serves to connect these terminals together for a purpose which will be more clear when the circuit arrangement shown in Fig. 6 is described.

Fig. 2 is an end view of the instrument viewed from the left end as it appears in Fig. 1. Fig. 2 shows a voltmeter 19 with its dial 17 and indicating pointer 18 and illustrates the position of the voltmeter in the end of the instrument where it may be conveniently read.

Figure 3:
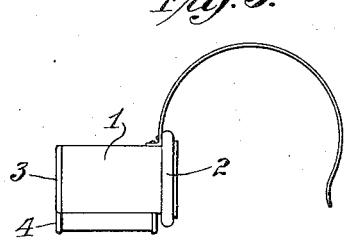
Fig. 3 illustrates the manner in which a telephone head band may be connected to the test set.

Fig. 3 illustrates the general appearance of the instrument when mounted on a head band of the type used with telephone receivers. The spring head band may be bolted or otherwise secured to the casing in any desired manner.

Figure 4:
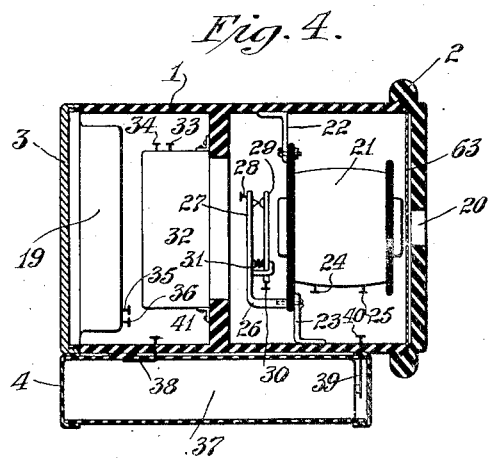
Fig. 4 is a sectional view of Fig. 1 showing the arrangement and mounting of the various equipment inside the casing.

Fig. 4 clearly shows the method of mounting the various instruments within the casing 1. The receiver cap 2 clamps a telephonic diaphragm 63 to the casing 1. The diaphragm 63 transmits its vibrations through an opening 20 in the receiver cap 2. A magnet 21 is secured to standards 22 and 23 and cooperates with the diaphragm to form a receiver of the usual type. The magnet 21 is provided with terminals 24 and 25. A bracket 26 of insulating material is secured to standard 23 and supports a vertical rod 27 of conducting material. A terminal 28 is provided to allow connections to be made readily to the rod 27. An armature 29 of conducting material is pivoted in an extension of bracket 26 and is in such relation to one of the pole pieces of magnet 21 as to be magnetically attracted thereby upon energization of the magnet. A terminal 30 is provided to enable connections to be made readily to the armature. The armature 29 is normally held in electrical engagement with the rod 28 by means of a retractile spring 31. A condenser 32 of any desired or well-known type is mounted on an inwardly extending ring of insulating material integral with the casing 1. The condenser is provided with terminals 33 and 34 by means of which electrical connections may be made. The voltmeter 19 is shown in its position at the extreme left of the casing with the retaining ring 3 screwed into place. Terminals 35 and 36 provide connection points for the voltmeter. A dry cell battery 37 is shown in position in the base of the instrument. The battery terminals are arranged to make spring engagement with leaf springs 38 and 39 which are connected to terminals 40 and 41 within the casing 1.

Figure 5:
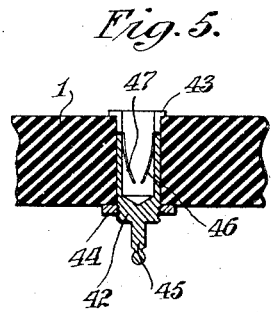
Fig. 5 shows a detail of the manner in which the terminals are preferably mounted in the casing.

Fig. 5 shows in detail the construction of a preferred form of jack to be used to form terminals 7 to 12 and 14 and 15. The casing 1 is shown in section. A cylindrical jack 42 provided with a shoulder ring 43 may be inserted in a hole in the casing 1 and secured by means of a nut 44. A flat strip 45, to which a soldered connection may conveniently be made, forms an integral extension of the cylindrical jack 42. The jack is provided with a cylindrical opening in which are mounted leaf springs 46 and 47 which serve to better the electrical connection when a tip or plug is inserted, and also by their spring action create friction to assist in holding the plug in position.

The method of interconnecting the various apparatus within the instrument will now be described. This is best seen by reference to Fig. 6. In this figure, the various terminals shown in Fig. 4 are indicated and numbered to correspond with the terminals of Fig. 4.

Battery terminal 40 is connected to external connection point 8. Battery terminal 41 is connected to external connection points 10 and 15 and to the terminal 28 of the back contact of the buzzer. Magnet terminal 24 is connected to external connection point 7, while magnet terminal 25 is connected to external connection points 9 and 14 in multiple. The terminal 30 of the buzzer armature 29 is connected in multiple with the magnet terminal 25 and condenser terminal 34. The other condenser terminal, which has been indicated at 33, is connected to external connection point 11. Voltmeter terminal 36 is connected to external connection point 12, while voltmeter terminal 35 is connected to external connection point 15.

It is thought that the possibilities of the instrument will be best understood from the following description in which various assumptions will be made as to which instruments are to be used for testing. Circuits will be traced showing the interconnection of the various terminals of the instrument to bring into the testing connection the equipment which it is desired to use under each assumption.

It will first be assumed that the instrument is to be used with only the receiver in circuit. In this case terminal A is connected to terminal 7 and terminal B is connected to terminal 9. Cord 16 plays no part in this connection and the tips C and D may be removed from terminals 14 or 15 or allowed to remain in engagement therewith according to the desire or convenience of the operator. With tip A in connection with terminal 7 and tip B in connection with terminal 9, a circuit may be completed to any circuit or apparatus under test when tips E and F are associated with such circuit and the key 13 is closed. This circuit extends from tip E, conductor 5, tip A, terminal 7, winding of magnet 21, terminal 9, tip B, conductor 6, key 13 to terminal F.

If it is desired to connect both the receiver and condenser to a circuit to be tested, the tip A is connected as before to terminal 7 and tip B is connected to terminal 11. Connection through the testing device now extends from tip E, conductor 5, tip A, terminal 7, receiver magnet 21, condenser 32, terminal 11, tip B, conductor 6, key 13 to tip F.

If it is desired to use the receiver in connection with the battery, tip A is brought into connection with terminal 7 and tip B is brought into connection with terminal 8, and tips C and D are connected to terminals 14 and 15 respectively. Connection to the circuit under test in this case extends from tip E, conductor 5, tip A, terminal 7, receiver magnet 21, terminal 14, tip C, cord 16, tip D, terminal 15, battery 37, terminal 8, tip B, conductor 6, key 13 to tip F. It will be noted that a parallel path extends through the armature and back contact of the buzzer, but this path is short circuited by the path through the cord 16, so that the buzzer cannot be effective under this condition. When the magnet 21 is energized, armature 29 is attracted, opening one branch of the circuit of magnet 21, but magnet 21 remains energized and can continue to operate as the magnet of a receiver, due to the closure of the above described shunt circuit by way of cord 16.

If it is desired to use the voltmeter and battery, tip A is connected to terminal 8 and tip B is connected to terminal 12. The connection or disconnection of cord 16 is immaterial at this time. In this case, connection to the circuit under test is established from tip E, conductor 5, tip A, terminal 8, battery 37, terminal 15, voltmeter 19, terminal 12, tip B, conductor 6, key 13 to tip F.

If it is desired to use the voltmeter only, tip A is connected to terminal 10 and tip B is connected to terminal 12. In this case, connection to the circuit under test is established from tip E, conductor 5, tip A, terminal 10, conductor 48, terminal 15, voltmeter 19, terminal 12, tip B, conductor 6, key 13 to tip F.

If it is desired to use the device as a tester comprising buzzer with battery supply, tip A is connected to terminal 7 and tip B is connected to terminal 8, and at least one of the tips C and D is removed from contact with its respective terminal 14 or 15. Connection to the circuit under test now extends from tip E, cord 5, tip A, terminal 7, winding of magnet 21, armature 29, back contact 27, battery 37, terminal 8, tip B, cord 6, key 13 to tip F. Since cord 16 is not used at this time to tie terminals 14 and 15 together, there is no shunt circuit about the buzzer contacts, and if the circuit being tested is complete, current will flow through the magnet 21, causing it to attract its armature 29, thereby breaking the circuit of the magnet and releasing the armature to again energize the magnet in the well understood manner of buzzer operation.

If it is desired to use the buzzer only without battery, tip A is connected to terminal 7 and tip B is connected to terminal 10. In this type of connection it is again essential that cord 16 be disconnected at at least one end. Connection to the circuit under test extends from tip E, cord 5, tip A, terminal 7, magnet 21, armature 29, back contact 27, conductor 48, terminal 10, tip B, cord 6, key 13 to tip F. As before, the possible short circuit around the buzzer contacts is avoided, due to the fact that cord 16 is ineffective.

It should be noted that the buzzer armature may be of much lighter construction than is usual with the ordinary buzzer. This is due to the fact that interruptions of the magnet circuit will cause the receiver diaphragm to vibrate, and the receiver diaphragm will produce sounds which will give the indication for which the ordinary buzzer is used. With this in mind, it is obvious that an ordinary receiver magnet may be used to operate the buzzer contacts.

If it is desired to use only the battery, tip A is connected to terminal 8 and tip B is connected to terminal 10. The circuits in this case are believed to be obvious.

If it is desired to use the condenser only for testing purposes, tip A is connected to terminal 9 and tip B is connected to terminal 11. The circuits in this case also appear to be obvious.

If it is desired to use the receiver and voltmeter, tip A is connected to terminal 7 and tip B is connected to terminal 12, while cord 16 is connected to terminals 14 and 15 by means of its tips C and D to short circuit the buzzer contacts 27 and 29. In this case, connection extends from the circuit under test to tip E, cord 5, tip A, terminal 7, receiver magnet 21, terminal 14, tip C, cord 16, tip D, terminal 15, voltmeter 19, terminal 12, tip B, cord 6 and key 13 to tip F.

The following table shows briefly the interconnections necessary to produce the above described combinations of the various pieces of apparatus included in the testing equipment:

| | | | |
|---|---|---|---|
| 1. Receiver only | A to 7 | B to 9 | C and D immaterial. |
| 2. Receiver and condenser | A to 7 | B to 11 | C and D immaterial. |
| 3. Receiver and battery | A to 7 | B to 8 | C to 14—D to 15. |
| 4. Voltmeter and battery | A to 8 | B to 12 | C and D immaterial. |
| 5. Voltmeter only | A to 10 | B to 12 | C and D immaterial. |
| Or | A to 15 | B to 12 | D disconnected. |
| 6. Buzzer and battery | A to 7 | B to 8 | Either C or D or both disconnected. |
| 7. Buzzer only | A to 7 | B to 10 | Either C or D or both disconnected. |
| 8. Battery only | A to 8 | B to 10 | C and D immaterial. |
| 9. Condenser only | A to 9 | B to 11 | C and D immaterial. |
| 10. Receiver and voltmeter | A to 7 | B to 12 | C to 14—D to 15. |

The above combinations serve to illustrate the possibilities of the device. It is of course possible to form other combinations involving three pieces of apparatus, but since the occasions on which it would be desirable to use three pieces of apparatus are relatively rare, it has not been considered necessary to discuss the further possibilities of the instrument.

Referring now to Fig. 7, a modification of the testing instrument will be described. This instrument is substantially similar in appearance and general arrangement to that just described, except that in this case a separate buzzer with its own operating magnet 49 has been included in place of the contacts controlled by the receiver magnet 21. This modification provides some circuit simplification over that previously described, but is, of course, more expensive, due to the fact that a complete and separate buzzer must be provided. In Fig. 7, parts corresponding to the parts of Fig. 4 have been correspondingly numbered, and it is believed that no further description is necessary.

The arrangement of the external connection points has not been shown on Fig. 7. In the modified form of the invention, only six external connection points are required, and these may be arranged in the manner in which terminals 7 to 12 inclusive are arranged in Fig. 1, or in any other desired or convenient manner. The external contact points have been shown in their relative positions in Fig. 8 and are numbered 52 to 57 inclusive. The various pieces of apparatus are interconnected among themselves and to the external contact points in a manner which should need no description in view of the full description given in connection with Fig. 6. Corresponding parts bear corresponding reference characters in Figs. 7 and 8.

The connections of the various pieces of apparatus in Fig. 8 are relatively simpler than those in Fig. 6, since the use of a separate buzzer eliminates the necessity for using the shunting cord 16. It is therefore believed to be unnecessary to trace in detail the circuits by means of which various interconnections of the testing apparatus are accomplished. The possibilities of the modified form of the invention will be apparent from consideration of the following table, since it is thought that the full description given in connection with Fig. 6 should make obvious the circuit arrangement of Fig. 8.

1. Receiver only ........... A to 55  B to 53.
2. Receiver through condenser .............. A to 56  B to 53.
3. Receiver and battery .. A to 57  B to 53.
4. Voltmeter and battery . A to 57  B to 52.
5. Voltmeter only ......... A to 55  B to 52.
6. Buzzer and battery .... A to 57  B to 54.
7. Buzzer only ............ A to 55  B to 54.
8. Battery only ........... A to 57  B to 55.
9. Condenser only ........ A to 56  B to 55.
10. Receiver and voltmeter A to 52  B to 53.
11. Buzzer and receiver ... A to 53  B to 54.

A plate showing the method of interconnecting the cords and terminals is secured to the casing at any convenient place.

It is of course obvious that various forms of switching devices can be mounted on the casing to control the various connections. Thus a rotary, hand operated switch is considered an equivalent for the plugs and terminals which I use to establish the various selections of apparatus and combinations of apparatus.

What is claimed is:

1. In a test set, a casing, a buzzer and a telephone receiver mounted in said casing, a common operating magnet for said buzzer and said receiver, an operating circuit for said magnet, a branch of said circuit extending through said buzzer contacts, and switching means to short circuit said buzzer contacts at desired times.

2. In a test set, a casing, a buzzer and a telephone receiver mounted in said casing, a common operating magnet for said buzzer and said receiver, an operating circuit for said magnet, a branch of said circuit extending through said buzzer contacts, a cord circuit, and means to short circuit said buzzer contacts by means of said cord circuit.

3. In a test set, a casing, connection terminals mounted on the exterior of said casing, a cord circuit arranged to be connected to said terminals at will, a buzzer and a telephone receiver mounted in said casing, a common operating magnet for said buzzer and said receiver, an operating circuit for said magnet, a branch of said circuit extending through said buzzer contacts, and means to short circuit said buzzer contacts at desired times by means of said cord circuit.

4. A testing device comprising a casing, a telephone receiver, a buzzer, a condenser, a voltmeter, and a battery carried by said casing, connections between said receiver, buzzer, condenser, voltmeter and battery, and terminals accessible from the exterior of the condenser, said terminals and connections being arranged to permit the receiver, the buzzer, the condenser, the voltmeter or the battery to be connected singly or in selected pairs, to a circuit to be tested.

5. A testing device comprising a casing, a telephone receiver, a buzzer, a condenser, a voltmeter, and a battery carried by said casing, connections between said receiver, buzzer, condenser, voltmeter and battery, and terminals accessible from the exterior of the condenser, said terminals and connections being arranged to permit the receiver, the buzzer, the condenser, the voltmeter or the battery to be connected singly or in selected pairs, to a circuit to be tested, together with a conductor for short-circuiting two of said terminals.

6. A testing device comprising a casing, a telephone receiver, a buzzer, a condenser, a voltmeter, and a battery carried by said casing, connections between said receiver, buzzer, condenser, voltmeter and battery, and terminals accessible from the exterior of the condenser, said terminals and connections being arranged to permit the receiver, the buzzer, the condenser, the voltmeter or the battery to be connected singly or in selected pairs, to a circuit to be tested, the casing also having a band secured thereto to enable it to be affixed to the head of the operator.

In testimony whereof I affix my signature.

HARRY R. VAN DEVENTER.